United States Patent
Price et al.

(10) Patent No.: US 6,795,717 B1
(45) Date of Patent: Sep. 21, 2004

(54) COMMUNICATIONS DEVICE HAVING RETRACTABLE DISPLAY MEANS

(75) Inventors: Tim U. Price, Salt Lake City, UT (US); Rick D. Giles, Sandy, UT (US); Thomas A. Johnson, Draper, UT (US)

(73) Assignee: 3Com Corporation, Rolling Meadows, IL (US)

( * ) Notice: Subject to any disclaimer, the term of this patent is extended or adjusted under 35 U.S.C. 154(b) by 0 days.

(21) Appl. No.: 09/564,197

(22) Filed: May 4, 2000

(51) Int. Cl.[7] .................................................. H04M 1/00
(52) U.S. Cl. .................. 455/566; 455/575.4; 455/575.3
(58) Field of Search .................................. 455/550, 566, 455/575, 425, 550.1, 553.1, 556.1, 556.2, 557.1, 575.3, 575.4, 575.8, 90.1, 90.2, 90.3; 379/433.04, 433.13, 433.12, 29.1, 88.11, 93.17, 93.23, 122, 136, 142.17, 144.01, 167.12, 201.04, 247, 354, 428.03; 345/87

(56) References Cited
U.S. PATENT DOCUMENTS 5,241,410 A  * 8/1993 Streck et al. ................ 359/176
5,970,402 A  * 10/1999 Vermeer ...................... 455/347
6,233,469 B1 * 5/2001 Watanabe .................... 455/575
6,320,591 B1 * 11/2001 Griencewic ................. 345/582
6,430,038 B1 * 8/2002 Helot et al. ................. 361/681

* cited by examiner

*Primary Examiner*—Nay Maung
*Assistant Examiner*—Tanmay Lele
(74) *Attorney, Agent, or Firm*—Baniak Pine & Gannon

(57) ABSTRACT

A communications device and method of operating the communications device are provided. The communications device includes a housing having a first edge portion. A display device is attached to a display device support member. The display support member is slidably attached to the housing to allow the display device to be positioned in an extended position beyond the first edge portion of the housing for viewing the display device when the communications device is in use and a retracted position within the housing when the communications device is not in use.

19 Claims, 2 Drawing Sheets

COMMUNICATIONS DEVICE HAVING RETRACTABLE DISPLAY MEANS

FIELD OF THE INVENTION

This invention relates generally to the field of communications devices, and, in particular, to a communications device having a retractable display means (such as, for example, a liquid crystal display) to provide additional information such as operational and communication parameters to a user of the device.

BACKGROUND OF THE INVENTION

Conventional electronic equipment such as, for example, modems, laptop computer, and handheld computing devices such as the PALM PILOT™ manufactured and sold by 3Com Corporation, of Santa Clara, Calif., are routinely used in the current mobile communications environment. It is often desirable in this environment for a user of these various types of electronic devices to know information about the status of operation of the devices in use. For example, it would be desirable in this mobile communications environment to have the ability to display various operational and communication parameters such as, for example, "hook" status, baud rate, signal strength, etc. Due to their strict dimensional requirements, however, these conventional electronic devices typically rely on rudimentary techniques such as, for example, Light Emitting Diodes (LED) and/or conventional error messages, in an attempt to convey operational and communication parameters to the user.

However, there are several disadvantages to these traditional methods. For example, they typically do not provide a wide range of usable information to the user. Moreover, these traditional methods are not user friendly because the user is oftentimes required to interpret the meaning of, for example, a blinking LED or an error message. As a result, these traditional methods not provide immediately recognizable information to the user.

Accordingly, it would be desirable to have a communications device that includes a retractable display means that overcomes the disadvantages described above.

SUMMARY OF THE INVENTION

One aspect of the invention provides a communications device including a housing having a first edge portion. A display device support member and a display device are also provided. The display device is attached to the display device support member. The display support member is slidably attached to the housing to allow the display device to be positioned in an extended position beyond the first edge portion of the housing for viewing the display device when the communications device is in use and a retracted position within the housing when the communications device is not in use. The communications device may preferably be a modem, a portable computer, or a handheld computing device. The display device may preferably be a liquid crystal display device, a plasma type display device, or a matrixed type display device. A communications connector may preferably be attached to the display device support member to provide a communications connection to the communications device. The communications connector may preferably be a telephone connector. A connection means for the communications connector may also be provided. The connection means may preferably electrically connect the communications connector to the communications device. A connection means for the display device may also be provided. The connection means for the display device may preferably electrically connect the display device to the communications device. The housing for the communications device may preferably be an outer housing.

Another aspect of the invention provides a method of operating a communications device. A housing for the communications device including a first edge portion is provided. A display device support member and a display device are also provided. The display device is attached to the display device support member, and the display support member is slidably attached to the housing. The display device is positioned in an extended position beyond the first edge portion of the housing for viewing the display device when the communications device is in use. The display device may preferably be positioned in a retracted position within the housing when the communications device is not in use.

Another aspect of the invention provides a communications device including an outer housing having a first edge portion. A display device support member includes an opening formed therein, and a display device is received within the opening. The display device is rotatably attached to the display device support member to allow the display device to be rotated between a stowed position and an angled position. The display support member is slidably attached to the outer housing to allow the display device to be positioned in an extended position beyond the first edge portion of the outer housing for viewing the display device when the communications device is in use and a retracted position within the housing when the communications device is not in use. The display device support member may further include a side wall, and a manually operable latching mechanism may preferably extend through the side wall. The manually operable latching mechanism may preferably be operatively coupled to the display device to allow the display device to rotate from the stowed position to the angled position.

Another aspect of the invention provides a method of operating a communications device. The communications device includes an outer housing having a first edge portion. A display device support member includes an opening formed therein, and a display device is received within the opening. The display device is rotatably attached to the display device support member, and the display support member is slidably attached to the outer housing. The display device is positioned in an extended position beyond the first edge portion of the outer housing for viewing the display device when the communications device is in use. The display device may preferably be positioned in a retracted position within the housing when the communications device is not in use. The display device may preferably be rotated from a stowed position to an angled position. The display device may preferably be rotated from the angled position to the stowed position. The display device support member may preferably include a side wall, and a manually operable latching mechanism may preferably extend through the side wall. The manually operable latching mechanism may preferably be operatively coupled to the display device. The manually operable latching mechanism may preferably retain the display device in the stowed position. The manually operable latching mechanism may preferably be depressed, and the display device may preferably be rotated from the stowed position to the angled position. The display device may preferably be rotated from the angled position to the stowed position, and the display device may preferably be retained in the stowed position with the manually operable latching mechanism.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE PRESENTLY PREFERRED EMBODIMENTS

Figure 1:
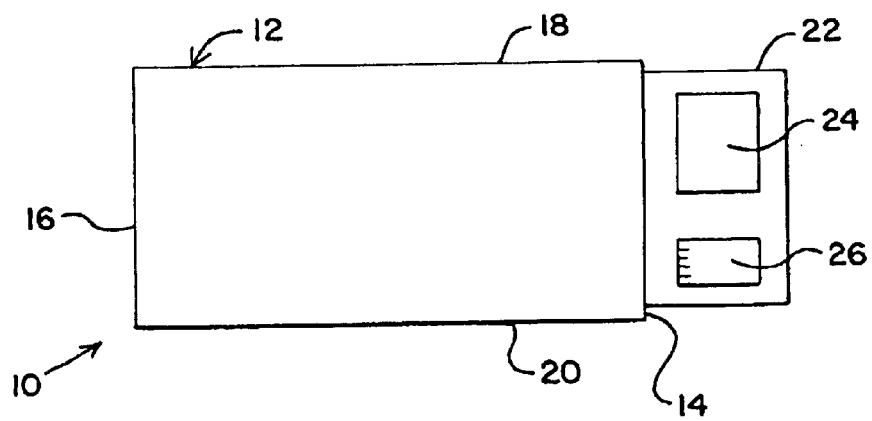
FIG. 1 is a plan view of a preferred embodiment of a communications device that is made in accordance with the invention showing a display support member and a display device in an extended position.
Figure 2:
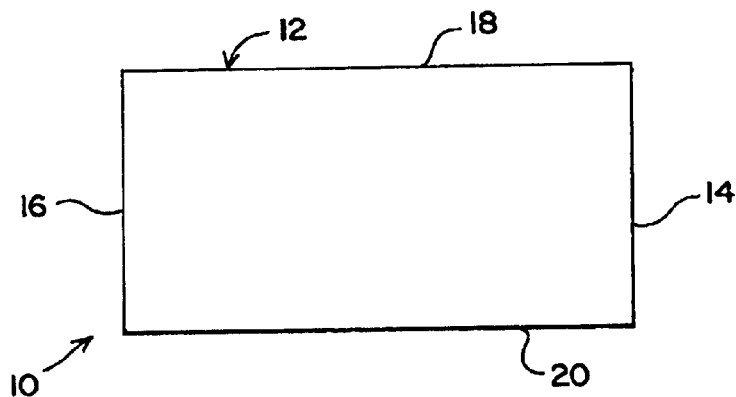
FIG. 2 is the embodiment of FIG. 1 showing the display support member and the display device in a retracted position.

A preferred embodiment of a communications device 10 is shown in FIGS. 1–2. In the embodiment shown in FIG. 1, the communications device 10 includes an outer housing 12 having a first edge portion 14, a second edge portion 16, a third edge portion 18, and a fourth edge portion 20. The shape and configuration of the outer housing 12 may vary depending upon the particular communications device housed within the housing 12. A display device support member 22 for supporting a display device 24 is also provided. The display device 24 may preferably be attached to the display device support member 22 in any conventional manner. As shown in FIGS. 1–2, the display support member 22 is slidably attached to the housing 12 to allow the display device 24 to be positioned in an extended position beyond the first edge portion 14 of the housing 12 for viewing the display device 24 when the communications device 10 is in use (see FIG. 1) and a retracted position within the housing 12 when the display device is not in use (see FIG. 2).

The communications device 10 may preferably be any conventional communications device such as, for example, a modem. Alternatively, the communications device 10 may preferably be a handheld computing device such as, for example, the PALM PILOT™ manufactured and sold by 3Com Corporation, of Santa Clara, Calif. The communications device 10 may also preferably be any one of the commercially available portable computers such as, for example, a laptop computer.

The display device 24 may preferably be any conventional display device suitable for displaying the various operational and communication parameters of the communications device 10 to the user of the device. For example, the display device 24 may preferably be a liquid crystal display device, plasma type display device, or matrixed type display device.

The display device support member 22 may preferably be any support member suitable for supporting and retaining the display device 24. The display device support member 22 may preferably be slidably attached to the housing 12 of the communications device 10 in any conventional to allow the display device support member 22 to be retractable. That is, the display device support member 22 may preferably be attached to the housing 12 to allow it to be positioned in both the extended position (as shown in FIG. 1) and the retracted position (as shown in FIG. 2). The display device support member 22 may also be hinged to allow it (and thus the display device 24) to be rotated to facilitate the viewing of the display device 24 from different angles. The display support member 22 may preferably be constructed from a single piece of rigid material, and may preferably have the same or similar construction to the XJACK™ device manufactured and sold by 3Com Corporation, of Santa Clara, Calif.

Figure 3:
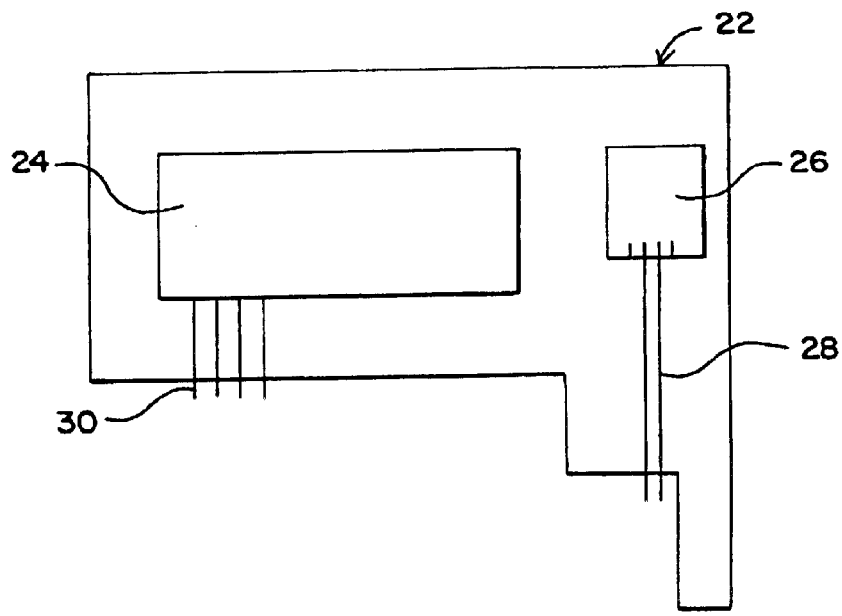
FIG. 3 is an enlarged view of the display support member and display device shown in FIG. 1.

Referring to FIGS. 1 and 3, a communications connector 26 may preferably be attached to the display device support member 22 for providing a communications connection to the communications device 10. The communications connector 26 may preferably be attached to the display device support member 22 in any conventional manner. The communications connector 26 may preferably be standard telephone connector such, for example, a RJ-11 connector or a RJ-45 connector. Referring to FIG. 3, a connection means 28 for the communications connector 26 may also be provided. The connection means 28 may preferably electrically connect the communications connector 26 to the communications device 10. The connection means 28 may preferably be any suitable electrical connection to provide the electrical connection between the communications connector 26 and the communications device 10.

Referring again to FIG. 3, a connection means 30 for the display device 24 may also be provided. The connection means 30 for the display device 24 may preferably electrically connect the display device 24 to the communications device 10. The connection means 30 for the display device 24 may preferably be any suitable electrical connection to provide the electrical connection between the display device 24 and the communications device 10.

Figure 4:
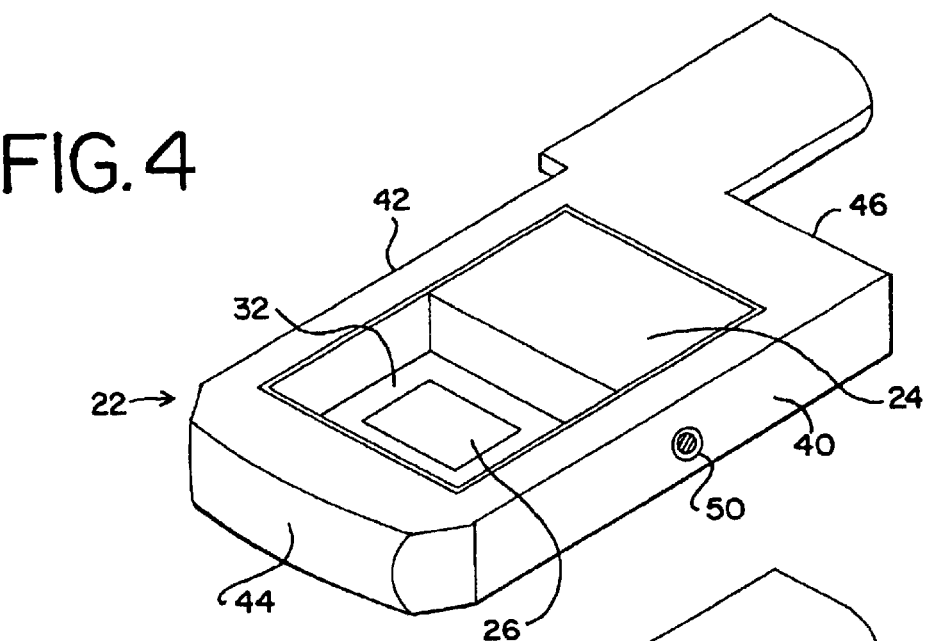
FIG. 4 is an enlarged perspective view of the display support member and the display device of FIG. 1 showing the display device in a stowed position.
Figure 5:
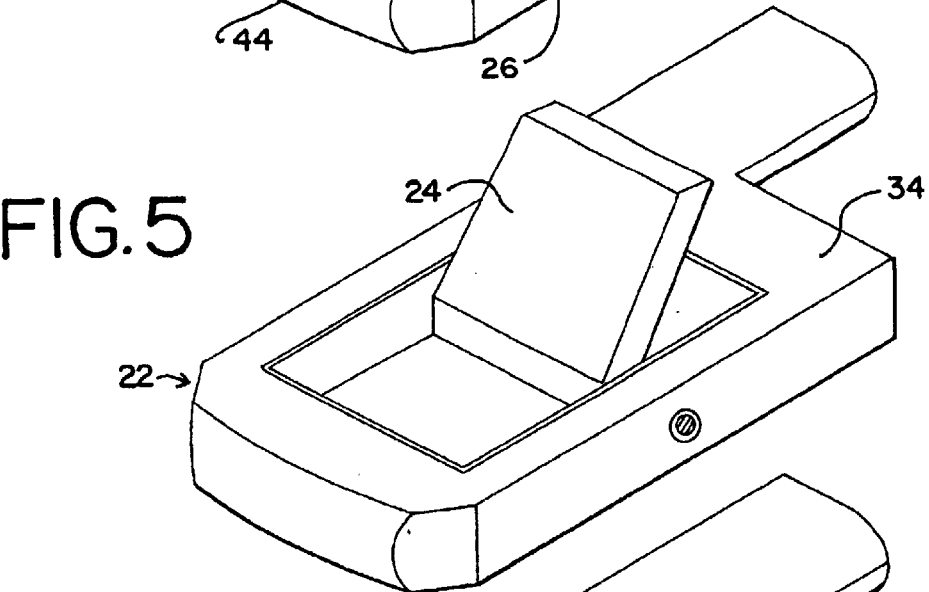
FIG. 5 is the embodiment of FIG. 4 showing the display device in an angled position.
Figure 6:
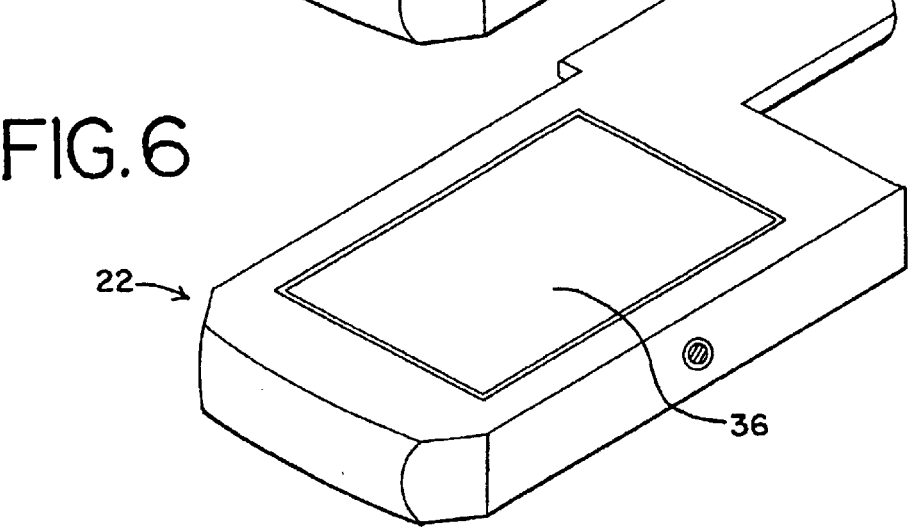
FIG. 6 is the embodiment of FIG. 4 showing an alternative embodiment of a display device that is made in accordance with the invention.

Referring to FIG. 4, the display device support member 22 may preferably include an opening 32 formed therein, and the display device 24 may preferably be received within the opening 32. The communications connector 26 may also be positioned within the opening 32. The display device 24 may preferably be rotatably attached to the display device support member 22 to allow the display device 24 to be rotated between a stowed position as shown in FIG. 4 and an angled position as shown in FIG. 5. It should be understood by those of ordinary skill in the art that the display device 24 may be angled in either direction, and various angles are contemplated. As shown in FIG. 5, when positioned in the angled position, the display device 24 is positioned at an angle with respect to a top surface 34 of display device support member 22. Positioning the display device 24 in the angled position facilitates the viewing of the display device 24 by the user. FIG. 6 illustrates the display device support member 22 including an alternative embodiment of a larger display device 36.

Referring again to FIG. 4, the display device support member 22 may preferably include a first side wall 40, a second side wall 42, a first end wall 44 and a second end wall 46. Again, the configuration of the display device support member 22 may vary depending upon the particular application. A manually operable latching mechanism 50 may preferably extend through the first side wall 40. The manually operable latching mechanism 50 may preferably be operatively coupled to the display device 24 to allow the display device 24 to rotate from the stowed position (as shown in FIG. 4) to the angled position (as shown in FIG. 5). When the display device 24 is in stowed position, the manually operable latching mechanism 50 may preferably retain the display device 24 in the stowed position.

In operation, and as shown in FIG. 1, the display device 24 is positioned in an extended position beyond the first edge portion 14 of the housing 12 for viewing the display device 24 when the communications device 10 is in use. In the embodiment shown, this is accomplished by positioning the display device support member 22 in the extended position. As shown in FIGS. 4–5, the display device 24 may then be rotated from a stowed position (FIG. 4) to an angled position (FIG. 5). This may be accomplished by depressing the manually operable latching mechanism 50 thereby releasing display device 24. The advantage of retractable display device 24 is that it provides more usable information (i.e. operational and communication parameters) to the user.

When the user is finished using the communications device 10, the display device 24 may preferably be rotated from the angled position to the stowed position as shown in FIGS. 4–5, and the display device 24 may preferably be retained in the stowed position with the manually operable latching mechanism 50. The display device 24 is then positioned in the retracted position within the housing 12 as show in FIG. 2. That is, the display device support member 22 is positioned in the retracted position within the housing 12. The advantage of this arrangement is that once the communications device 10 is no longer in use, the display device 24 can be quickly and conveniently stored within the housing 12 of the communications device 12, which is especially advantageous due to the portable nature of such devices.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A communications device comprising:
   a housing for the communications device, the housing including a first edge portion, a retractable display device support member, the retractable display device support member supporting and containing a display device and a communications connector, the communications connector adapted to allow communications between the communications device and a remote device, a connection means electrically connecting the communications connector to the communications device to allow communications to be routed between the communications connector and the communications device, the retractable display support member slidably attached to the housing to allow the display device and the communications connector to be positioned in an extended position beyond the first edge portion of the housing for viewing the display device and accessing the communications connector when the communications device is in use and a retracted position within the housing when the communications device is not in use.

2. The communications device of claim 1 wherein the display device comprises a liquid crystal display device.

3. The communications device of claim 1 wherein the display device comprises a plasma type display device.

4. The communications device of claim 1 wherein the display device comprises a matrixed type display device.

5. The communications device of claim 1 wherein the communications connector comprises a telephone connector.

6. The communications device of claim 1 wherein the communications device comprises a modem.

7. The communications device of claim 1 wherein the communications device comprises a portable computer.

8. The communications device of claim 1 wherein the communications device comprises a handheld computing device.

9. The communications device of claim 1 further comprising a connection means for the display device, the connection means for the display device electrically connecting the display device to the communications device.

10. The communications device of claim 1 wherein the housing for the communications device is an outer housing.

11. A method of operating a communications device providing the steps of:
   providing a housing for the communications device, the housing including a first edge portion, a retractable display device support member, the retractable display device support member supporting and containing a display device and a communications connector, the communications connector adapted to allow communications between the communications device and a remote device, a connection means electrically connecting the communications connector to the communications device to allow communications to be routed between the communications connector and the communications device, the retractable display support member slidably attached to the housing; and
   positioning the display device and the communications connector in an extended position beyond the first edge portion of the housing for viewing the display device and accessing the communications connector when the communications device is in use.

12. The method of claim 11 further comprising the steps of:
   positioning the display device in a retracted position within the housing when the communications device is not in use.

13. A communications device comprising:
   an outer housing for the communications device, the outer housing including a first edge portion, a display device support member including an opening formed therein, a communications connector received within the opening and attached to the display device support member, the communications connector adapted to allow communications between the communications device and a remote device, a display device received within the opening, the display device rotatably attached to the display device support member to allow the display device to be rotated between a stowed position and an angled position, the display support member also slidably attached to the outer housing to allow the display device to be positioned in an extended position beyond the first edge portion of the outer housing for viewing the display device when the communications device is in use and a retracted position within the housing when the communications device is not in use.

14. The communications device of claim 13 wherein the display device support member includes a side wall and further comprising a manually operable latching mechanism extending through the side wall, the manually operable latching mechanism operatively coupled to the display device to allow the display device to rotate from the stowed position to the angled position.

15. A method of operating a communications device comprising the steps of:

providing an outer housing for the communications device, the outer housing including a first edge portion, a display device support member including an opening formed therein, a communications connector received within the opening and attached to the display device support member, the communications connector adapted to allow communications between the communications device and a remote device, a display device received within the opening, the display device rotatably attached to the display device support member, the display support member slidably attached to the outer housing;

positioning the display device in an extended position beyond the first edge portion of the outer housing for viewing the display device when the communications device is in use; and rotating the display device from a stowed position to an angled position.

16. The method of claim 15 further comprising the steps of:

rotating the display device from the angled position to the stowed position.

17. The method of claim 11 further comprising the steps of:

positioning the display device in a retracted position within the housing when the communications device is not in use.

18. The method of claim 15 wherein the display device support member includes a side wall and further comprising the steps of providing a manually operable latching mechanism extending through the side wall, the manually operable latching mechanism operatively coupled to the display device, the manually operable latching mechanism retaining the display device in the stowed position;

depressing the manually operable latching mechanism; and rotating the display device from the stowed position to the angled position.

19. The method of claim 18 further comprising the steps of:

rotating the display device from the angled position to the stowed position; and retaining display device in the stowed position with the manually operable latching mechanism.

* * * * *